(12) United States Patent
Iwamura et al.

(10) Patent No.: US 8,478,285 B2
(45) Date of Patent: Jul. 2, 2013

(54) BASE STATION, MOBILE STATION, SYNCHRONIZATION CONTROL METHOD, AND IC CHIP

(75) Inventors: Mikio Iwamura, Yokohama (JP); Minami Ishii, Yokohama (JP); Atsushi Harada, Kawasaki (JP)

(73) Assignee: NTT DoCoMo, Inc., Tokyo (JP)

( * ) Notice: Subject to any disclaimer, the term of this patent is extended or adjusted under 35 U.S.C. 154(b) by 377 days.

(21) Appl. No.: 12/305,922

(22) PCT Filed: Mar. 23, 2007

(86) PCT No.: PCT/JP2007/056103
§ 371 (c)(1),
(2), (4) Date: Apr. 16, 2009

(87) PCT Pub. No.: WO2007/148458
PCT Pub. Date: Dec. 27, 2007

(65) Prior Publication Data
US 2010/0113054 A1 May 6, 2010

(30) Foreign Application Priority Data
Jun. 19, 2006 (JP) .................................. 2006-169430

(51) Int. Cl.
*H04W 72/04* (2009.01)
(52) U.S. Cl.
USPC .......... 455/452.1; 455/517; 370/278; 370/329
(58) Field of Classification Search
USPC ........................... 455/452; 370/328–338, 350
See application file for complete search history.

(56) References Cited

U.S. PATENT DOCUMENTS

| 5,550,992 | A | 8/1996 | Hashimoto | |
|---|---|---|---|---|
| 5,875,182 | A * | 2/1999 | Hatzipapafotiou | 370/321 |
| 6,359,870 | B1 * | 3/2002 | Inoue et al. | 370/337 |
| 2005/0201296 | A1 | 9/2005 | Vannithamby et al. | |
| 2005/0289256 | A1 | 12/2005 | Cudak et al. | |
| 2006/0045032 | A1* | 3/2006 | Hamada | 370/329 |
| 2008/0287138 | A1* | 11/2008 | Yoon et al. | 455/452.2 |

FOREIGN PATENT DOCUMENTS

| CN | 1781274 A | 5/2006 |
|---|---|---|
| JP | 11-027203 A | 1/1999 |
| JP | 11-275038 A | 10/1999 |
| JP | 2002-524938 T | 8/2002 |

(Continued)

OTHER PUBLICATIONS

Russian Office Action for Application No. 2008151383/09, mailed on Nov. 3, 2010 (9 pages).

(Continued)

*Primary Examiner* — Kashif Siddiqui
(74) *Attorney, Agent, or Firm* — Osha Liang LLP

(57) ABSTRACT

A synchronization control method in a communication system including a mobile station and a base station includes generating a synchronization request at the base station when data addressed to the mobile station arrives, receiving the synchronization request from the base station at the mobile station, transmitting feedback information at the mobile station as a response to the synchronization request, receiving the feedback information at the base station, generating timing advance information at the base station based on a reception timing of the feedback information, transmitting the timing advance information from the base station to the mobile station, and adjusting a transmission timing of uplink data at the mobile station, based on the timing advance information.

4 Claims, 6 Drawing Sheets

FOREIGN PATENT DOCUMENTS

| | | | |
|---|---|---|---|
| JP | 2003-504954 | T | 2/2003 |
| JP | 2006-067099 | A | 3/2006 |
| KR | 20050078635 | A | 8/2005 |
| WO | 0013426 | A2 | 3/2000 |
| WO | 01/05080 | A1 | 1/2001 |

OTHER PUBLICATIONS

Japanese Office Action for Application No. 2009-195943, mailed on Feb. 22, 2011 (4 pages).

Japanese Office Action for Application No. 2008-522323, mailed on Apr. 27, 2010 (5 pages).

Office Action with Mexican Patent Application No. MX/a/2008/016164, dated Aug. 12, 2010, with English translation thereof (4 pages).

Patent Abstracts of Japan, Publication No. 11-275038, dated Oct. 8, 1999, 1 page.

Patent Abstracts of Japan, Publication No. 2006-067099, dated Mar. 9, 2006, 1 page.

Patent Abstracts of Japan, Publication No. 11-027203, dated Jan. 29, 1999, 1 page.

3GPP TS 36.300 V0.9.0, Mar. 2007, TSG RAN, "Evolved Universal Terrestrial Radio Access (E-UTRA) and Evolved Universal Terrestrial Radio Access Network (E-UTRAN)," Overall description, Stage 2 (Release 8), 87 pages.

3GPP TR 25.814 V7.0.0, Jun. 2006, TSG RAN, "Physical layer aspects for evolved Universal Terrestrial Radio Access (UTRA)," Release 7, 126 pages.

3GPP TR 25.813 V7.0.0, Jun. 2006, TSG RAN, "Evolved Universal Terrestrial Radio Access (E-UTRA) and Evolved Universal Terrestrial Radio Access Network (E-UTRAN)," Radio interface protocol aspects (Release 7), 39 pages.

International Search Report issued in PCT/JP2007/056103, mailed on Jul. 10, 2007, with translation, 3 pages.

Written Opinion issued in PCT/JP2007/056103, mailed on Jul. 10, 2007, with translation, 7 pages.

Office Action for Chinese Patent Application No. 200780022661.2 issued Jul. 25, 2012, with English translation thereof (13 pages).

Office Action for Canadian Application No. 2,656,421 dated Jul. 26, 2012 (3 pages).

Office Action for U.S. Appl. No. 13/228,659 mailed Dec. 8, 2011 (10 pages).

Office Action for Chinese Application No. 2007/80022661.2 Issued Jan. 11, 2012, with English translation thereof (13 pages).

Office Action for Korean Application No. 2008-7030662 mailed Jan. 18, 2012, with English translation thereof (9 pages).

Office Action for Australian Patent Application No. 2007262249 dated Apr. 30, 2012 (2 pages).

W-CDMA Mobile Communication Method, Under the Editorship of Keiji Tachikawa, 4th Printing, issued Mar. 15, 2002, pp. 222 to 223.

Office Action for Chinese Patent Application No. 200780022661.2 issued Mar. 5, 2013, with English translation thereof (16 pages).

* cited by examiner

BASE STATION, MOBILE STATION, SYNCHRONIZATION CONTROL METHOD, AND IC CHIP

TECHNICAL FIELD

The present invention relates to a base station, a mobile station, a synchronization control method, and an IC chip. Particularly, the present invention relates to a base station, a mobile station, a synchronization control method, and an IC chip when the mobile station performs an intermittent reception.

BACKGROUND ART

In an increasing demand for high speed and high quantity radio communications, power saving in mobile stations is required. One of the techniques for the power saving is an intermittent reception.

The intermittent reception is a technique that achieves a power saving by activating a mobile station only when the mobile station needs to receive a signal transmitted from a base station while the mobile station is in a stand-by state. The intermittent reception is also referred to as a DRX (Discontinuous Reception), and further referred to as a DRX/DTX (Discontinuous Reception/Discontinuous Transmission) when the intermittent reception is accompanied with intermittent transmission of feedback information or the like.

In a downlink of Evolved UTRA and UTRAN (Super 3G) radio access schemes, which is in process of being standardized with HSDPA (High Speed Downlink Packet Access) or 3GPP, multiple access is achieved in such a manner that a scheduler of a base station controls transmission assignment by using a shared data channel in a time-sharing manner. The minimum time unit of a transmission assignment control is referred to as a sub-frame.

Data is transmitted via a shared data channel (DL-SCH) and is accompanied with a shared control channel (DL-SCCH). A signaling is performed on the DL-SCCH, for information identifying the user to which the data on the DL-SCH is addressed, or for information identifying a transport format (for example, a modulation method, coding ratio, or the like) used for transmitting the data on the DL-SCH.

Each mobile stations receives the DL-SCCH for every sub-frames, detects a presence/absence of the data addressed to the own mobile station. When the data addressed to the mobile station exist, the mobile station demodulates the DL-SCH and receives the data.

Here, for example, in a communication service such as Web Browsing, transmission data arrives at a system intermittently. Accordingly, when the mobile station receives the DL-SCCH at all times, a battery of the mobile station is exhausted.

In this regard, when data does not exist for a certain period of time, the battery of the mobile station can be saved by performing the DRX.

FIG. 1 shows an operational example of an intermittent reception in the mobile station when the DL-SCH and the DL-SCCH are used.

The mobile station checks the DL-SCCH to detect whether or not data addressed to the mobile station exists. When the data exists, the mobile station demodulates the DL-SCH.

In addition, when the data addressed to the mobile station exists, the mobile station continuously receives the DL-SCCH in the next and subsequent sub-frames (mode 1).

However, when the data addressed to the mobile station does not exist continuously for a predetermined time (t1), the mobile station shifts to a state where the DL-SCCH is intermittently received (for example, once in 8 sub-frames) (mode 2).

When the data addressed to the mobile station does not exist for a continuous predetermined time even after the mobile station shifts to the mode 2, the mobile station may further extend an interval of processing the DL-SCCH (for example, once in 16 sub-frames) (mode 3).

Whether or not to perform such stepwise DRX may be determined by following protocols which are arranged in advance between the base station and the mobile station.

When new data arrives at the base station while the mobile station performs the intermittent reception, the base station transmits data via the DL-SCH in accordance with the timing of the intermittent reception of the mobile station, and signals the arrival of the new data, via the DL-SCCH.

When the mobile station confirms that the data addressed to the own mobile station exists by processing the DL-SCCH during the intermittent reception, the mobile station returns to the mode of continuously processing DL-SCCH in the next and subsequent sub-frames (mode 1).

In FIG. 1, the mobile station in mode 1 reports a CQI (Channel Quality Indicator) to the base station in order to perform a scheduling or a link adaptation in the base station.

Here, the CQI is referred to as, for example, an index showing a radio channel quality such as a reception SIR (Signal to Interference Power Ratio) of a downlink pilot channel.

The base station compares the CQI among the users, and assigns a transmission opportunity to a user having a better radio quality (scheduling), so as to obtain an effect of multiuser-diversity.

Further, the base station can determine a transport format, a transmission power, or the like in accordance with the CQI. (link adaptation)

Meanwhile, the mobile station in mode 2 can report the CQI in accordance with the timing of the DRX (for example, right before the DRX). In other words, the CQI can be intermittently reported in accordance with DRX cycles (DTX).

When this DRX/DTX cycle is sufficiently short, a synchronization of the uplink signal is maintained between the base station and the mobile station, by periodically reporting the CQI.

However, when the DRX/DTX cycle is long, the uplink synchronization cannot be maintained even when the CQI is periodically reported. For example, when the DRX/DTX cycle is long as in mode 3, the uplink synchronization is lost even when the CQI is reported.

In a system in which uplink time division multiple access is performed, as in the case of Super 3G, reception timings in the base station are required to be within a predetermined time (for example, within a cyclic prefix of OFDM symbol).

As shown in FIG. 2, when the mobile station moves (T1 to T2), a distance between the mobile station (UE) and the base station (eNodeB) is changed, and thus a propagation delay is changed accordingly.

Therefore, when the mobile station transmits the CQI at certain intervals, the reception timing may not be synchronized and thereby causes interferences in the previous and next sub-frames.

In order to prevent such a synchronization loss, the base station is required to control the transmission timing in the mobile station, by measuring the reception timing in the base station so as to notify the measured reception timing to the mobile station.

Here, in order to simplify the description, it is assumed that mode 2 is referred to as a state where the reception timing in the base station will surely fall within a predetermined time when the CQI is reported in accordance with the DRX/DTX cycles, and where a uplink synchronization can be maintained by measuring the timing loss in the base station and by controlling the transmission timing in the mobile station.

Meanwhile, it is assumed that mode 3 is referred to as a state where the reception timing in the base station does not fall within a predetermined time and where interference is caused in the previous and next sub-frames when the CQI is reported in accordance with the DRX/DTX cycles.

Here, a problem arises in the above-described mode 3 in which the interference is caused in the previous and next sub-frames because of the synchronization loss when the CQI is reported in accordance with the DRX/DTX cycle.

Further, another problem arises in which the battery of the mobile station and the uplink radio resource are consumed because the CQI is periodically reported even when the data hardly arrives.

Meanwhile, in order to solve these problems, the CQI may be set not to be reported in accordance with the DRX/DTX cycles. In this case, however, another problem arises in which the link adaptation cannot be applied to the transmission of first data when downlink data is generated during the DRX, thereby a radio transmission efficiency is deteriorated.

Furthermore, when the first data is transmitted at the DRX timing before the uplink synchronization is established, a reception response transmitted from the mobile station to the first data (for example, ACK/NACK response of HARQ) may be lost because the base station cannot receive the reception response at a correct timing.

When the reception response is lost, a problem arises in which the first transmission is wasted and thereby a valuable radio resource is wasted.

Non-patent document 1: W-CDMA mobile communication method, under the editorship of Keiji Tachikawa, 4th printing, issued on Mar. 15, 2002, on page 222 to 223.

DISCLOSURE OF THE INVENTION

The present invention has been made in view of the current situations of the conventional technique as described above. An object of the present invention is to prevent an occurrence of an uplink synchronization loss between a base station and a mobile station when the mobile station performs an intermittent reception.

A first aspect of the present invention is summarized as a base station communicating with a mobile station that performs an intermittent reception, including: a control channel generating unit configured to generate a synchronization request when data addressed to the mobile station arrives; a feedback information receiving unit configured to receive feedback information, as a response to the synchronization request; and a signal propagation delay time measurement unit configured to measure a signal propagation delay time by using a reception timing of the feedback information.

In the first aspect of the present invention, channel quality information may be transmitted in the feedback information.

In the first aspect of the present invention, the control channel generating unit may generate a synchronization request including information on a radio resource for receiving the channel quality information.

In the first aspect of the present invention, the control channel generating unit may generate a synchronization request that specifies a mobile station identifier, and the feedback information may include a data series corresponding to the mobile station identifier specified by the synchronization request.

A second aspect of the present invention is summarized as a mobile station performing an intermittent reception for a base station, including: a synchronization request receiving unit configured to receive a synchronization request from the base station; and a feedback information generating unit configured to generate feedback information, as a response to the synchronization request.

The second aspect of the present invention may include a channel quality information measurement unit configured to measure channel quality information, and the channel quality information may be transmitted in the feedback information.

The second aspect of the present invention may further include a DRX control unit configured to suspend a transmission of the channel quality information to the mobile station, in accordance with cycles of the intermittent reception.

In the second aspect of the present invention, the feedback information may include a data series corresponding to the mobile station identifier specified by the synchronization request.

A third aspect of the present invention is summarized as a synchronization control method in a communication system including a mobile station performing an intermittent reception and a base station, including: generating, at the base station, a synchronization request, when data addressed to the mobile station arrives; receiving, at the mobile station, the synchronization request from the base station; transmitting, at the mobile station, feedback information, as a response to the synchronization request; receiving, at the base station, the feedback information; and measuring, at the base station, a signal propagation delay time by using a reception timing of the feedback information.

The third aspect of the present invention may further include: measuring, at the mobile station, channel quality information, and the channel quality information may be transmitted in the feedback information.

In the third aspect of the present invention, the feedback information may include a data series corresponding to the mobile station identifier specified by the synchronization request.

A fourth aspect of the present invention is summarized as an IC chip having a function to perform an intermittent reception for a base station, including: a synchronization request receiving unit configured to receive a synchronization request from the base station; and a feedback information generating unit configured to generate feedback information, as a response to the synchronization request.

BEST MODE FOR CARRYING OUT THE INVENTION

<First Embodiment>

Figure 1:
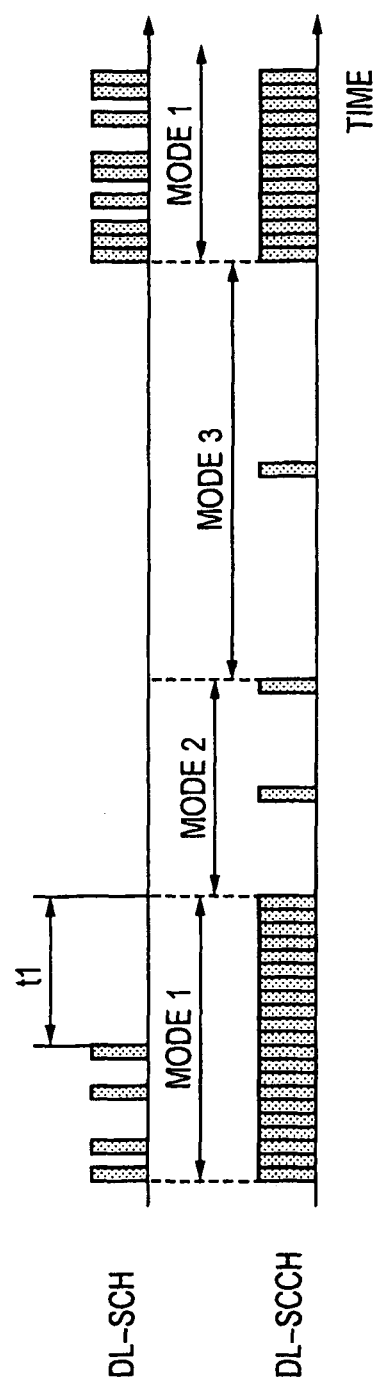
FIG. 1 is a view showing a DRX/DTX.

A first embodiment of the present invention will be described by referring to the drawings.

In the first embodiment of the present invention, it is assumed that a CQI is used as channel quality information notified from a mobile station (UE) to a base station (eNodeB).

(Flow of Signal)

Figure 2:
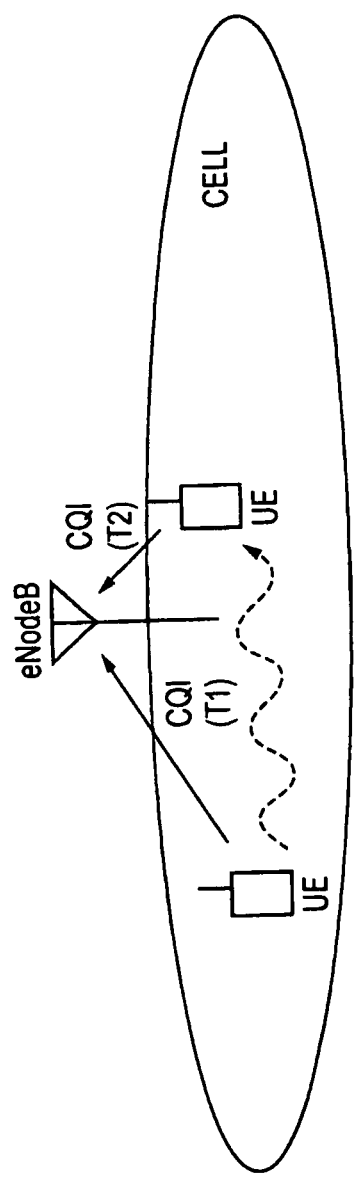
FIG. 2 is a view showing a change of a propagation environment to cause a synchronization loss.

As shown in FIG. 2, a distance between the mobile station and the base station is changed while the mobile station performs an intermittent reception. As a result, a synchronization loss may occur between the base station and the mobile station.

In a state where the synchronization loss occurs, the reception timing in the base station does not fall within a predetermined time, which results in causing interference in the previous and next sub-frames.

For example, when the CQI is reported in accordance with the DRX/DTX cycle in mode 3 in FIG. 1, the reception timing in the base station does not fall within a predetermined time, and interference in the previous and next sub-frames occurs.

Figure 3:
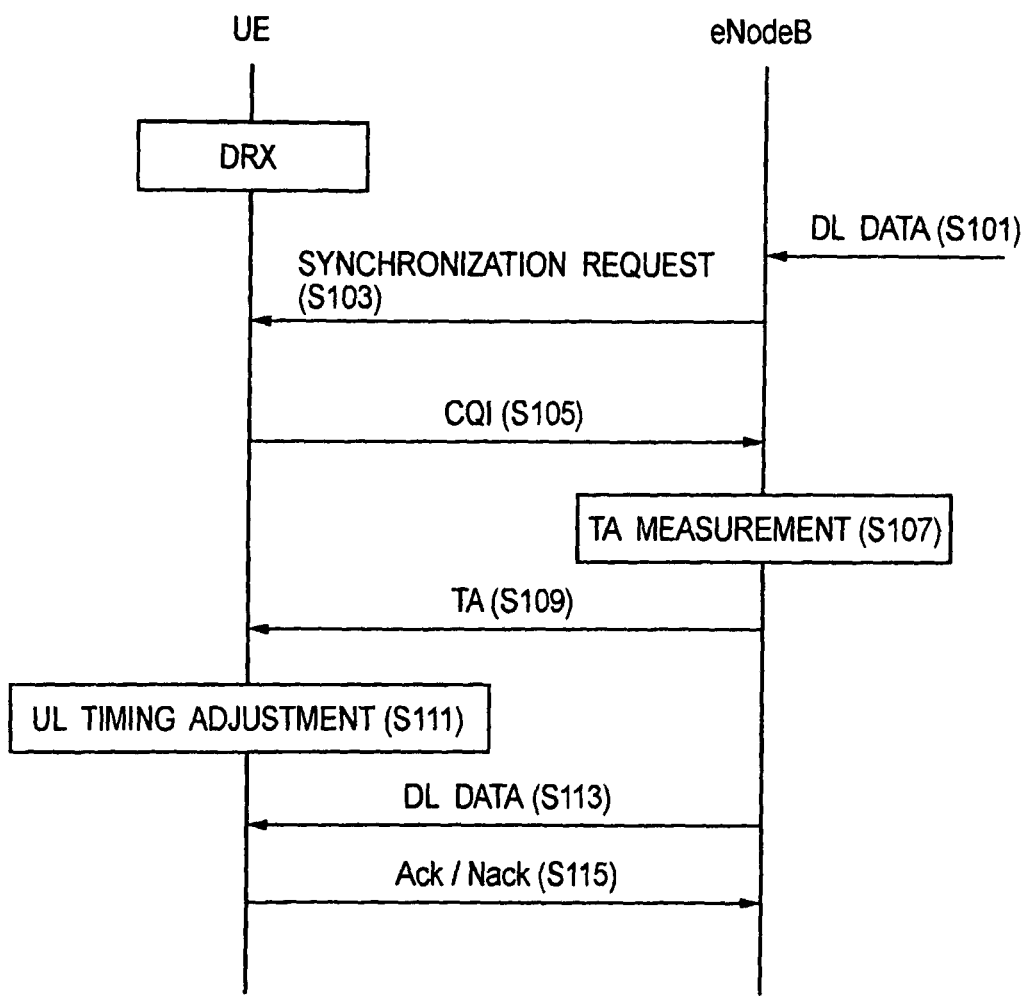
FIG. 3 is view showing a flow of a signal transmitted between a base station and a mobile station according to a first embodiment of the present invention.

FIG. 3 shows a flow of a signal for performing a synchronization between the base station and the mobile station, to deal with the above-described interference.

Note that, a signal propagation delay time, which is measured by using the reception timing of the signal received at the base station from the mobile station, is referred to as a timing advance (TA: Timing Advance).

When the downlink data arrives at the base station (eNodeB) (S101), the base station transmits a synchronization request (UL sync request) to the mobile station (UE) (S103).

As shown in FIG. 1, when the base station transmits the synchronization request to the mobile station via a shared data channel (DL-SCH) and a shared control channel (DL-SCCH), the base station may notify, via the DL-SCCH, that the synchronization request addressed to the mobile station exists, and may transmit the synchronization request via the DL-SCH.

Alternatively, the base station may transmit the synchronization request via the DL-SCCH, together with the notification of the presence of the synchronization requests.

When transmitting the synchronization request, the base station may specify the uplink radio resource for receiving a response to the synchronization request.

Such an uplink radio resource may include a frequency, a sub-frame, and a mobile station identifier (Signature).

An asynchronous channel (random access channel) is used for transmitting a response to the synchronization request from the mobile station.

In order to avoid a collision in this asynchronous channel, a synchronization request in which a frequency and a sub-frame is specified may be used.

Further, in order to associate the response, which is received via the asynchronous channel, with the mobile station from which the response is transmitted, a synchronization request in which the mobile station identifier (Signature) is specified may be used.

The mobile station having received the synchronization request transmits the CQI to the base station (S105).

Here, the mobile station may transmit the CQI already measured. Alternatively, the mobile station may measure the CQI when the mobile station receives the synchronization request from the base station so as to transmit the measured CQI to the base station.

While the mobile station performs the intermittent reception, there is a possibility that a synchronization loss occurs. Accordingly, the mobile station transmits the CQI via an asynchronous channel.

As described above, in a case where the uplink radio resource is specified by the synchronization request, the mobile station transmits the CQI by using the specified radio resource.

The base station having received the CQI measures a signal propagation delay time by using the reception timing of the CQI, and generates timing advance information (S107).

The base station transmits this timing advance information to the mobile station (S109).

The mobile station having received the timing advance information adjusts the uplink transmission timing (S111).

Next, the mobile station receives downlink data from the base station (S113) and transmits a data reception result (Ack/Nack) to the base station (S115).

Note that, in FIG. 3, the base station transmits the timing advance information and the downlink data in different frames. However, the downlink data and the timing advance information may be transmitted in the same frame.

When the downlink data and the timing advance information are transmitted in the same frame, the mobile station adjusts the transmission timing of the uplink data and demodulates the downlink data by using the timing advance information.

In this manner, by adjusting the transmission timing in the mobile station, the reception timing of the signal transmitted from the mobile station to the base station falls within a cyclic prefix (CP: cyclic prefix). Accordingly, the interference in the previous and next sub-frames can be decreased.

In addition, the base station receives the CQI from the mobile station, as a response to the synchronization request. Accordingly, the link adaptation can be applied. In other words, a radio resource can be optimally assigned. For example, proper modulation and coding scheme (MCS: Modulation and Coding Scheme) or transmission power can be applied.

(Configuration of Mobile Station)

Figure 4:
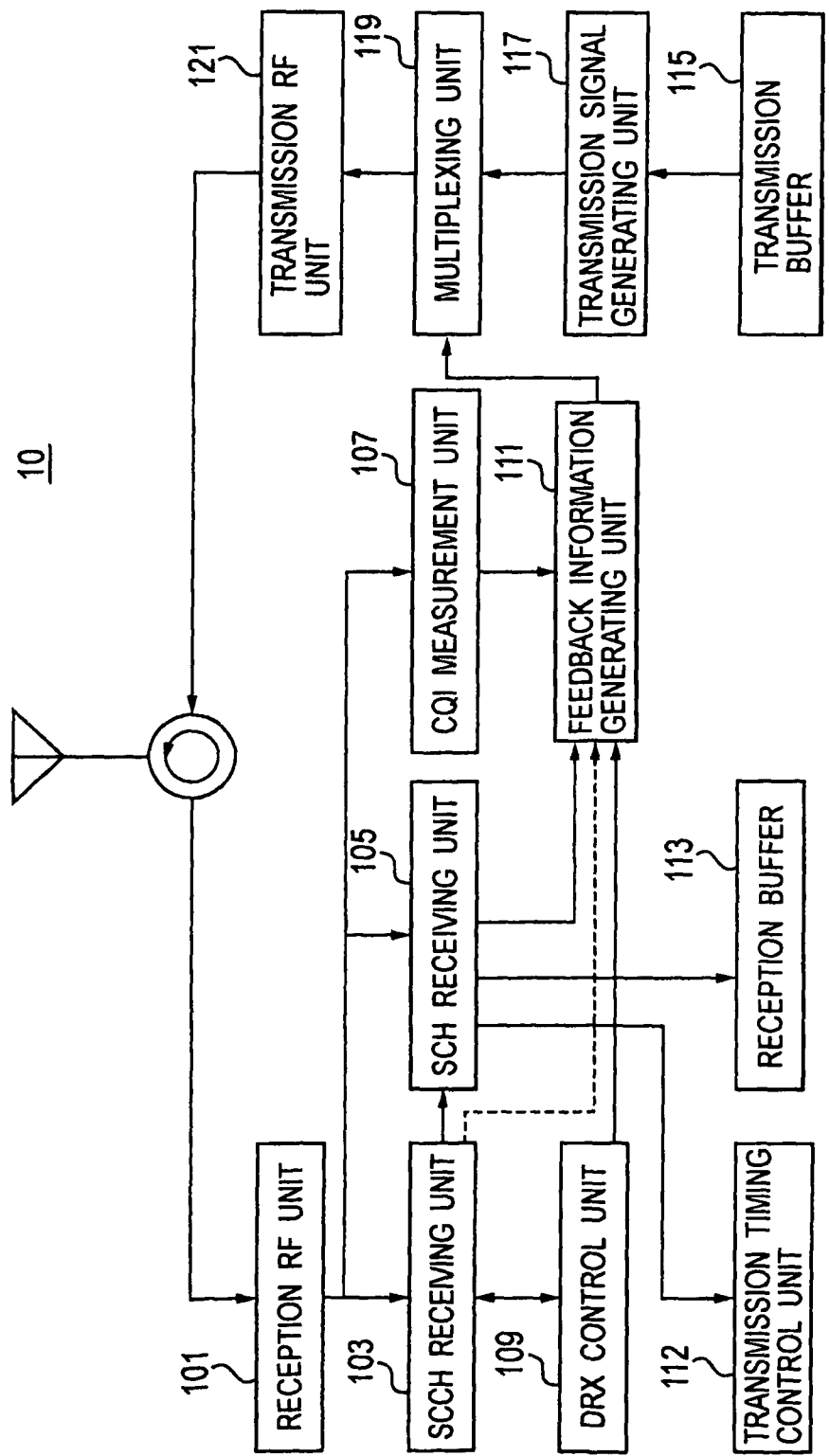
FIG. 4 is a block diagram of the mobile station according to the first embodiment of the present invention.

FIG. 4 shows a block diagram of the mobile station 10 according to an example of the present invention.

Specifically, the mobile station 10 includes a reception RF unit 101, an SCCH receiving unit 103, an SCH receiving unit 105, a CQI measurement unit 107, a DRX control unit 109, a feedback information generating unit 111, a transmission timing control unit 112, a reception buffer 113, a transmission buffer 115, a transmission signal generating unit 117, a multiplexing unit 119, and a transmission RF unit 121.

The reception RF (Radio Frequency) unit 101 receives a signal transmitted from the base station and separates signal components such as a shared control channel (DL-SCCH) and a shared data channel (DL-SCH).

The SCCH receiving unit 103 checks the DL-SCCH so as to detect whether or not data addressed to the own mobile station exists, and notifies presence or absence of the data, to the DRX control unit 109.

The DRX control unit 109 controls the frequency of processing the DL-SCCH. In other words, the DRX control unit 109 controls the SCCH receiving unit 103 so as to intermittently process the DL-SCCH in a case where data addressed to the own mobile station does not exist within a predetermined time.

When the DRX/DTX cycle is long, there is a possibility that a synchronization loss occurs even when the mobile station periodically reports the CQI. In such a case, the DRX control unit 109 may instruct the feedback information generating unit 111 to suspend the transmission of the CQI to the base station in accordance with the DRX cycles.

For example, since the DRX cycle is long in mode 3 in FIG. 1, the reception timing in the base station may not fall within a predetermined time even when the CQI is reported. Accordingly, the DRX control unit 109 controls so as to suspend the transmission of the CQI to the base station.

Typically, the base station transmits the synchronization request by using the DL-SCCH and the DL-SCH.

Then, the SCCH receiving unit 103 of the mobile station checks whether or not the synchronization request exists. When the synchronization request exists, the SCH receiving unit 105 extracts the information included in the synchronization request.

Note that, when the synchronization request is transmitted by using only the DL-SCCH, the SCCH receiving unit 103 extracts the information included in the synchronization request (shown by dotted line in FIG. 4).

The DL-SCH includes user data, and the user data addressed to the own mobile station is stored in the reception buffer 113.

The feedback information generating unit 111 generates feedback information for transmitting, to the base station, the CQI measured by the CQI measurement unit 107.

When the synchronization request is received from the base station, the feedback information generating unit 111 generates the feedback information for transmitting the CQI, to the base station, as a response to the synchronization request.

Note that, when the feedback information generating unit 111 receives an instruction from the DRX control unit 109 and when the CQI is transmitted to the base station in accordance with the DRX cycle, the feedback information generating unit 111 does not need to generate the feedback information for transmitting the CQI to the base station.

The transmission buffer 115 stores the user data to be transmitted to the base station from the mobile station 10.

When the user data is stored in the transmission buffer 15, the transmission signal generating unit 117 generates a transmission signal to be transmitted to the base station.

The multiplexing unit 119 multiplexes the feedback information and the transmission signal, and transmits the feedback information and the transmission signal to the base station through the transmission RF unit 121. Here, the feedback information is generated by the feedback information generating unit 111 and includes the CQI. Further, the transmission signal is generated by the transmission signal generating unit 117.

Meanwhile, the timing advance information received from the base station is received by the SCH receiving unit 105.

The transmission timing control unit 112 adjusts the transmission timing of the uplink data by using the timing advance information.

(Configuration of Base Station)

Figure 5:
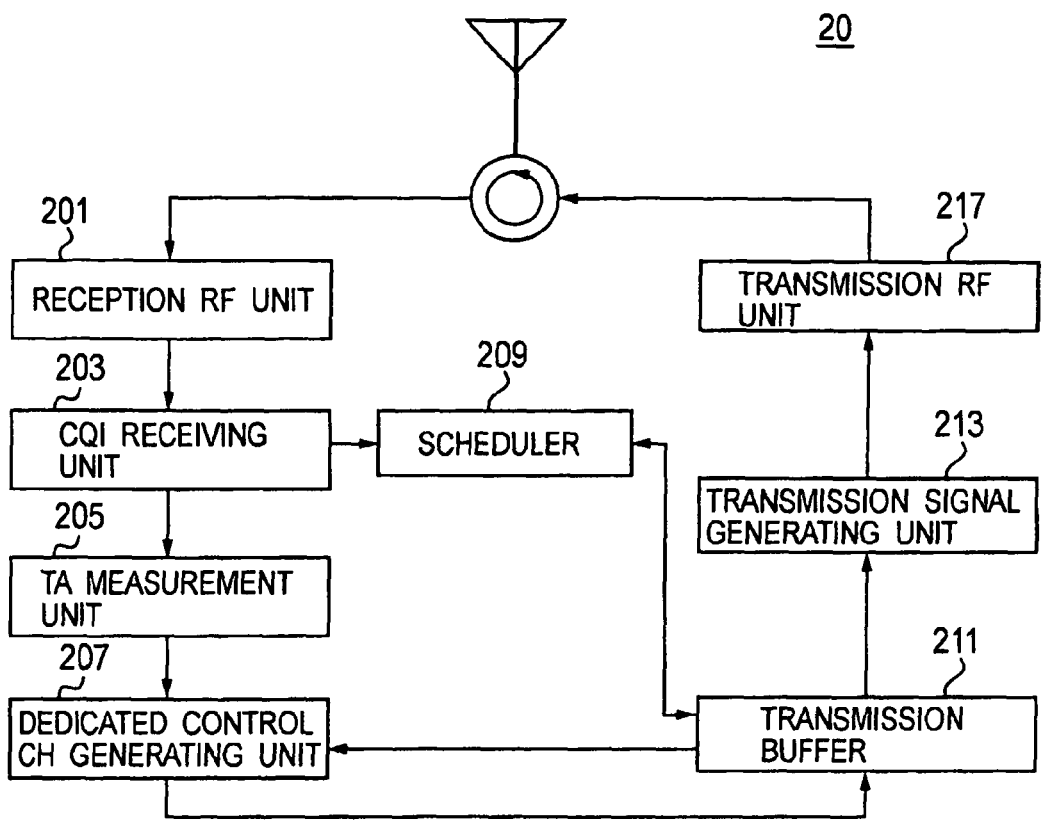
FIG. 5 is a block diagram of the base station according to the first embodiment of the present invention.

FIG. 5 is a block diagram of the base station 20 according to an example of the present invention.

The base station 20 includes a reception RF unit 201, a CQI receiving unit 203, a TA measurement unit 205, a dedicated control CH generating unit 207, a scheduler 209, a transmission buffer 211, a transmission signal generating unit 213, and a transmission RF unit 217.

The reception RF unit 201 receives a signal transmitted from the mobile station and separates signal components.

When the mobile station transmits the CQI to the base station 20, the CQI is received by the CQI receiving unit 203 through the reception RF unit 201.

The TA measurement unit 205 measures a signal propagation delay time by using the reception timing of the CQI, and generates the timing advance information.

The dedicated control CH generating unit 207 generates control information for transmitting the timing advance information to the mobile station. The timing advance information is stored in the transmission buffer 211.

The scheduler 209 performs a scheduling to assign the user data to a proper resource block, by considering the CQI and by referring to QoS (Quality of Service) and/or an accumulated data amount of the user data stored in the transmission buffer 211.

As a result of this scheduling, the scheduler 209 inform the transmission buffer 211 of a data size (transport block size) to be assigned to the resource block.

The transmission buffer 211 stores the user data to be transmitted to the mobile station from the base station 20. When the user data arrives at this transmission buffer 211, the transmission buffer 211 instructs the dedicated control CH generating unit 207 to generate the synchronization request.

The dedicated control CH generating unit 207 generates the synchronization request. Then, the dedicated control CH generating unit 207 stores the synchronization request in the transmission buffer 211.

The transmission signal generating unit 213 generates a transmission signal for transmitting, to the mobile station, the user data having the data size instructed by the scheduler 209. The transmission signal generating unit 213 transmits the transmission signal to the mobile station through the transmission RF unit 217.

The user data stored in the transmission buffer 211 (including the timing advance information and the synchronization request) is transmitted to the mobile station via the shared control channel (DL-SCCH) and the shared data channel (DL-SCH).

As described above, according to the present embodiment, the occurrence of the uplink synchronization loss between the base station and the mobile station can be prevented when the mobile station performs the intermittent reception.

(Second Embodiment)

In the above-described first embodiment, a description has been given of an example in which the feedback information includes the CQI (Channel Quality Information). However, the present invention is not limited to this, and is applicable to an example in which the feedback information includes another piece of information.

Hereinafter, a second embodiment of the present invention will be described mainly on differences with the above-described first embodiment.

Figure 6:
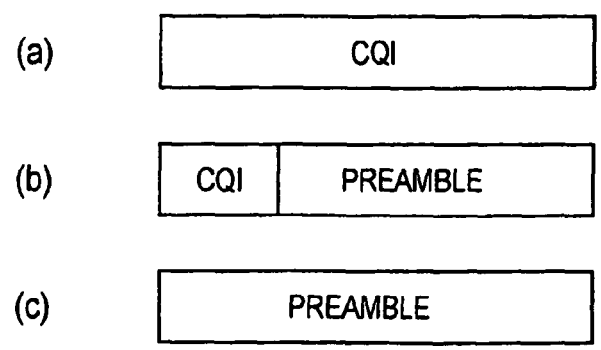
FIG. 6 is a view showing an example of feedback information used in the first embodiment and a second embodiment of the present invention.

The feedback information generating unit 111 of the mobile station according to the first embodiment is configured to generate the feedback information that transmits the CQI measured by the CQI measurement unit 107,(for example, feedback information including the CQI measured by the CQI measurement unit 107, as shown in FIG. 6(*a*)).

In addition, the feedback information generating unit 111 of the mobile station according to the first embodiment is configured to generate the feedback information that transmits the CQI by using a radio resource (mobile station identifier (Signature)) specified by the synchronization request transmitted from the base station (for example, feedback information including the CQI, which is measured by the CQI measurement unit 107, and a preamble, as shown in FIG. 6(*b*)).

Here, the preamble indicates a data series configured of a part or all of the mobile station identifier (Signature) specified by the synchronization request. The preamble may also be a data series specified, among multiple predetermined data series, by a mobile station identifier (Signature) specified by the synchronization request.

For example, when the feedback information consists of 6-bits, the feedback information is configured so as to include the CQI in 1-bit and the preamble in 5-bits.

In contrast, a feedback information generating unit 111 of a mobile station according to the present embodiment is configured to generate feedback information that includes a preamble but does not include CQI, as shown in FIG. 6(*c*).

Here, similar to the first embodiment, the preamble may be a data series configured of a part or all of a mobile station identifier (Signature) specified by the synchronization request or may be a data series specified, among multiple predetermined data series, by a mobile station identifier (Signature) specified by the synchronization request.

In the present embodiment, the preamble may also be a data series that is assigned to each mobile station in advance.

A transmission RF unit 121 is configured to transmit, via an asynchronous channel (random access channel), the feedback information generated by the feedback information generating unit 111, as a response to the synchronization request.

The TA measurement unit 205 of the mobile station according to the first embodiment is configured to measure the signal propagation delay time by using the reception timing of feedback information (CQI) received by the CQI receiving unit through the reception RF unit 201, and to generate the timing advance information.

In contrast, a TA measurement unit 205 of a base station according to the present embodiment is configured to measure a signal propagation delay time by using the reception timing of feedback information (preamble) received through a reception RF unit 201, and to generate the timing advance information.

In addition, in the present embodiment, similar to the case in the first embodiment, the synchronization request (UL sync request) and the timing advance information may be transmitted through a transmission RF unit 217, by using a shared control channel (DL-SCCH) or a shared data channel (DL-SCH).

In addition, in the present embodiment, similar to the case in the first embodiment, a dedicated control CH generating unit 207 is configured to generate the synchronization request.

At this time, the dedicated control CH generating unit 207 may be configured to select a dedicated preamble for a mobile station UE from a set of preambles stored therein, and to generate the synchronization request that specifies the mobile station identifier (Signature) corresponding to the selected dedicated preamble for the mobile station UE.

Figure 7:
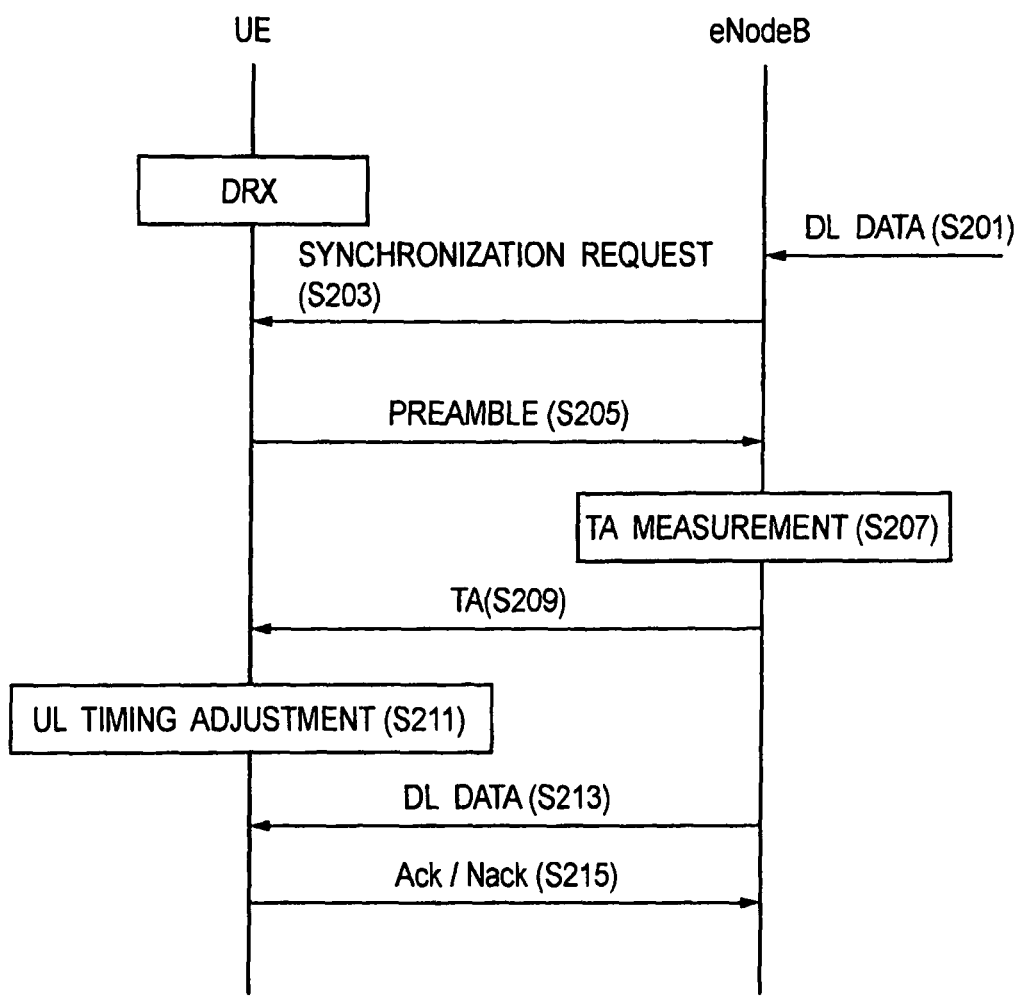
FIG. 7 is a view showing a flow of a signal transmitted between a base station and a mobile station according to the second embodiment of the present invention.

FIG. 7 shows a flow of a signal for performing a synchronization between the base station and the mobile station in the present embodiment. The flow shown in FIG. 7 is basically similar to the flow shown in FIG. 3, except for step S205.

As shown in FIG. 7, when the downlink data arrives at a base station (eNodeB) (S201), the base station transmits a synchronization request (UL synch request) for specifying a mobile station identifier (Signature) to the mobile station (UE) via a shared data channel or a shared control channel (S203).

The mobile station having received the synchronization request transmits, to the base station, feedback information including a preamble corresponding to the mobile station identifier specified by the synchronization request via an asynchronous channel (random access channel) (S205).

The base station having received the feedback information (preamble) measures a signal propagation delay time by using the reception timing of the feedback information, and generates timing advance information. (S207)

The base station transmits this timing advance information to the mobile station via the shared data channel or the shared control channel (S209).

The mobile station having received the timing advance information adjusts the uplink transmission timing (S211).

Next, the mobile station receives downlink data from the base station (S213) and transmits a data reception result (Ack/Nack) to the base station (S215).

According to the present embodiment, it is possible to solve the problem that: a reception response transmitted from the mobile station to the first data from the mobile station (for example, ACK/NACK response of HARQ) is lost because the base station cannot receive the reception response at a correct timing, when the first data is transmitted at the DRX timing before the uplink synchronization is established.

It should be noted that, a part or all of functions (modules) of the mobile station according to the first and the second embodiments may be achieved by hardware or software on an IC chip.

For example, on an IC chip, a function (module) to configure a MAC sub-layer and a physical layer, which are generally simple and required to perform high-speed processing, may be implemented by hardware, and a function (module) to configure a RLC sub-layer, which is generally required to perform complex processing, may be implemented by software.

In addition, the function (module) to configure the physical layer, the function (module) to configure the MAC sub-layer, and the function (module) to configure the RLC sub-layer may be achieved on a same IC chip or may be achieved on different IC chips.

INDUSTRIAL APPLICABILITY

According to the above-described embodiments of the present invention, an occurrence of un uplink synchronization loss between the base station and the mobile station can be prevented when the mobile station performs an intermittent reception.

In addition, a link adaptation can be applied to the transmission of the first data when returning from an intermittent reception state to a data transmission/reception state. Accordingly, the radio transmission efficiency and the throughput can be improved, and the transmission delay can be prevented.

The invention claimed is:

1. A radio communication method in which a mobile station receives signaling information transmitted by a base station via a shared control channel, detects a presence/absence of data addressed to the mobile station, demodulates a shared data channel when the data is present, and receives data transmitted by the base station, the method comprising the steps of:

transmitting, from the base station to the mobile station, a synchronization request specifying a Signature and an uplink radio resource via the shared control channel;

transmitting, at the mobile station, feedback information which includes a data series corresponding to the Signature specified by the synchronization request, as a response to the synchronization request, via a random access channel;

generating, at the base station, timing advance information based on a timing of receipt of the feedback information, and transmitting, from the base station to the mobile station, the timing advance information; and adjusting, at the mobile station, a transmission timing of uplink data based on the timing advance information.

2. A base station used in a radio communication system in which a mobile station receives signaling information transmitted by a base station via a shared control channel, detects a presence/absence of data addressed to the mobile station, demodulates a shared data channel when the data is present, and receives data transmitted by the base station, comprising:
- a synchronization request transmitting unit configured to transmit, to the mobile station, a synchronization request specifying a Signature and an uplink radio resource via the shared control channel;
- a feedback information receiving unit configured to receive, from the mobile station, feedback information which includes a data series corresponding to the Signature specified by the synchronization request, as a response to the synchronization request, via a random access channel; and
- a timing advance information generating/transmitting unit configured to generate timing advance information when receiving the feedback information, and to transmit, to the mobile station, the timing advance information.

3. A mobile station configured to receive signaling information transmitted by a base station via a shared control channel, to detect a presence/absence of data addressed to the mobile station, to demodulate a shared data channel when the data is present, and to receive data transmitted by the base station, comprising:
- a synchronization request receiving unit configured to receive, from the base station, a synchronization request specifying a Signature and an uplink radio resource via the shared control channel;
- a feedback information transmitting unit configured to transmit feedback information which includes a data series corresponding to the Signature specified by the synchronization request, as a response to the synchronization request, via a random access channel; and
- an adjusting unit configured to adjust a transmission timing of uplink data, based on timing advance information transmitted by the base station.

4. An IC chip having a function of a mobile station configured to receive signaling information transmitted by a base station via a shared control channel, to detect a presence/absence of data addressed to the mobile station, to demodulate a shared data channel when the data is present, and to receive data transmitted by the base station, wherein the mobile station comprises:
- a synchronization request receiving unit configured to receive, from the base station, a synchronization request specifying a Signature and an uplink radio resource via the shared control channel;
- a feedback information transmitting unit configured to transmit feedback information which includes a data series corresponding to the Signature specified by the synchronization request, as a response to the synchronization request, via a random access channel; and
- an adjusting unit configured to adjust a transmission timing of uplink data, based on timing advance information transmitted by the base station.

* * * * *